July 2, 1963
L. N. YOHE
3,095,919
TRACTION DEVICE
Filed Feb. 20, 1961
5 Sheets-Sheet 1
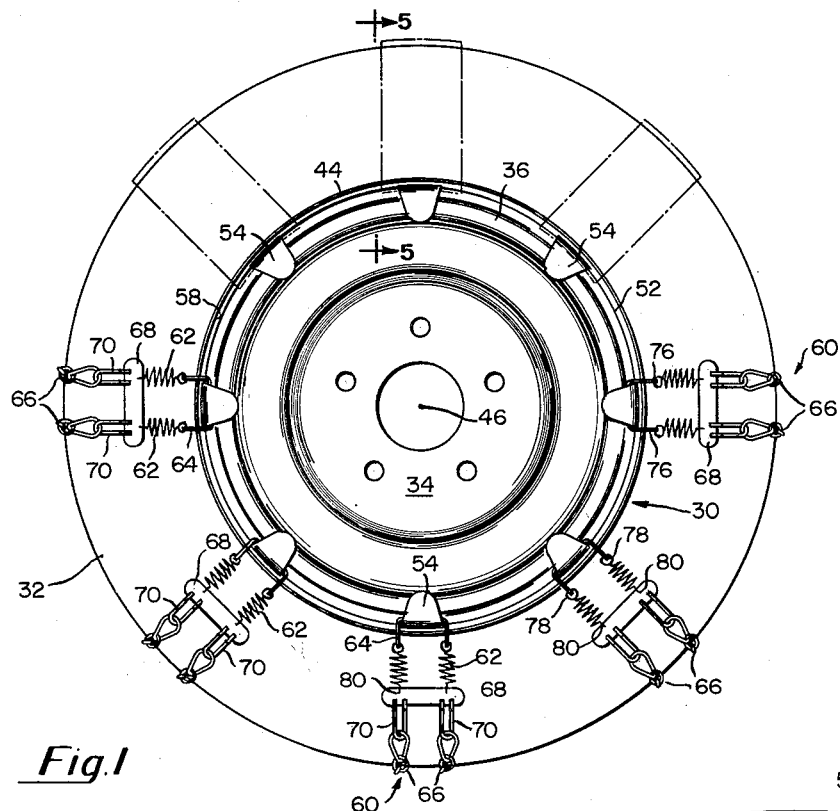
Fig.1
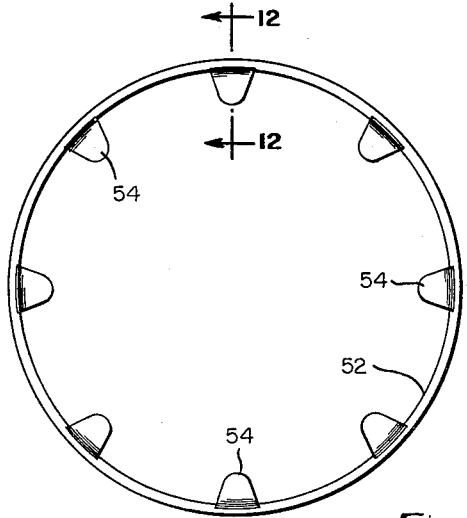
Fig.2
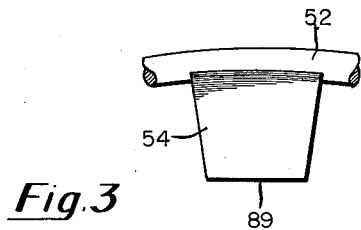
Fig.3
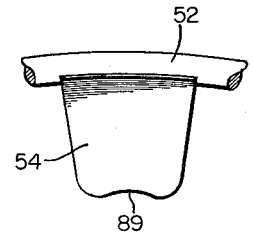
Fig.4
INVENTOR.
LESTER N. YOHE
AGENT

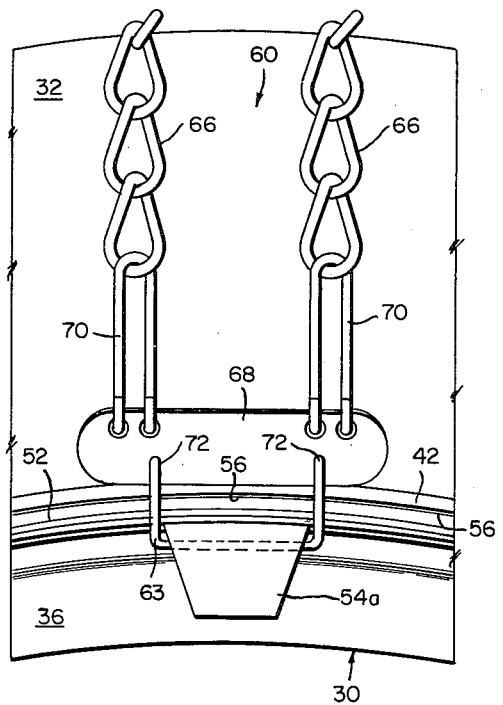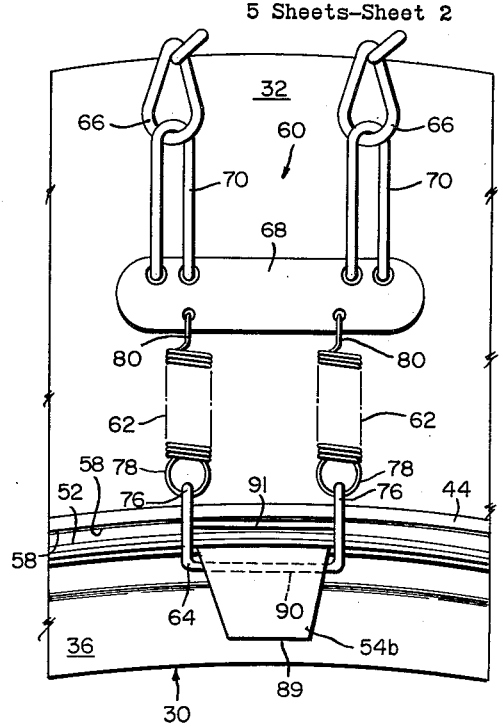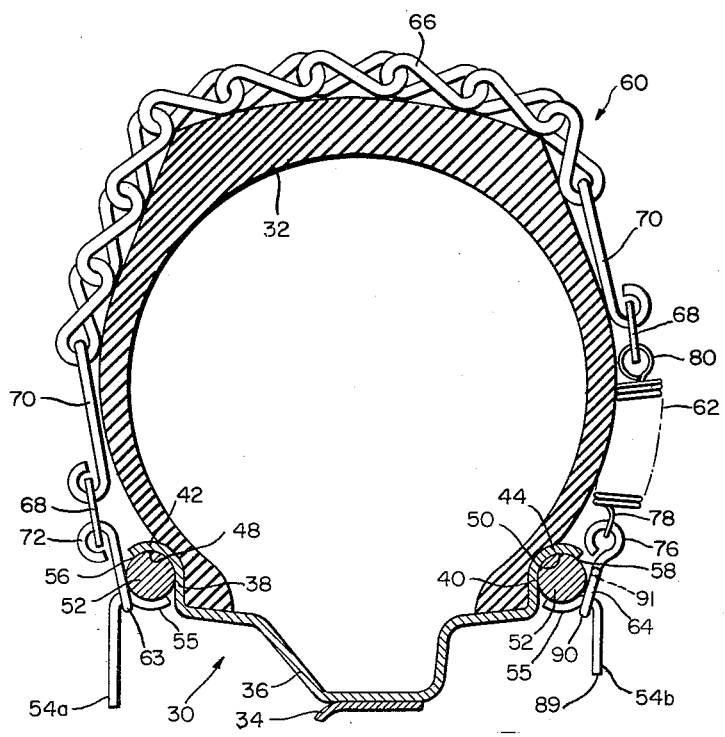

July 2, 1963 — L. N. YOHE — 3,095,919
TRACTION DEVICE
Filed Feb. 20, 1961 — 5 Sheets-Sheet 3

July 2, 1963  L. N. YOHE  3,095,919
TRACTION DEVICE
Filed Feb. 20, 1961  5 Sheets-Sheet 4

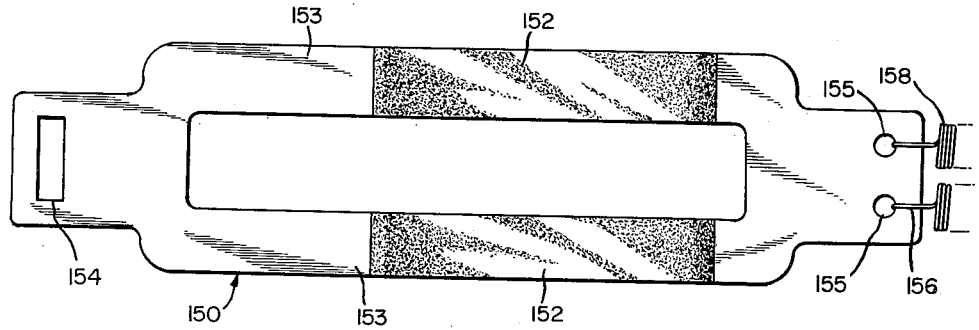
Fig. 21
Fig. 22
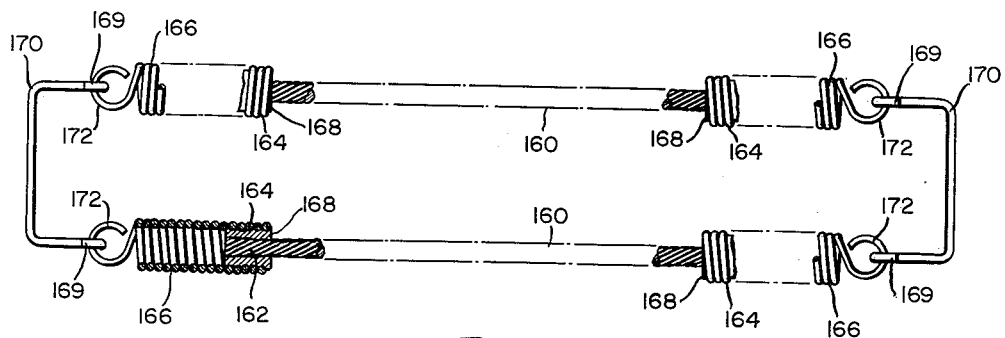
Fig. 23
Fig. 24
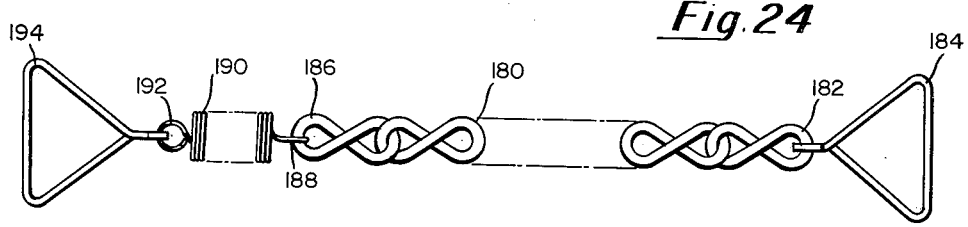
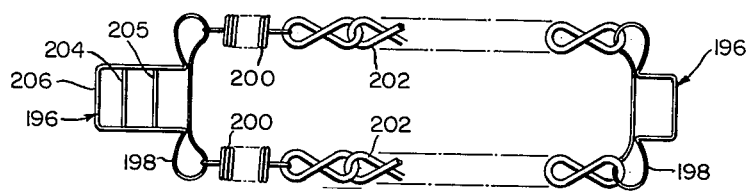
Fig. 25

3,095,919
TRACTION DEVICE
Lester N. Yohe, 1601 Melrose Ave., Havertown, Pa.
Filed Feb. 20, 1961, Ser. No. 90,406
5 Claims. (Cl. 152—236)

The invention hereinafter described and claimed has to do with traction devices and more particularly to such devices which are useful on the wheels of automobiles and other motor vehicles to prevent skidding. With still more particularity the invention relates to such devices which are more commonly known as tire chains, or mud hooks.

There has been a long felt need for devices of this kind which may easily be applied to the wheels under all conditions, but particularly under adverse conditions such as encountered with a deep snow fall. Often, by way of example, a motor vehicle may skid so deeply into snow that it is impossible, without help, to extricate it under its own power. The commonly used tire chains may do the trick but it is impossible to mount them on the wheels under such conditions. Highways frequently are lined with stalled vehicles after a heavy snow, particularly a surprise snow which catches the motorist unawares and unprepared. Then too motorists may find themselves in mud or deep sand or other condition where wheel applied traction devices would succor them, but where it is convenient, if not impossible, to apply them.

It is, therefore, the object of the present invention to provide a traction device overcoming these difficulties by affording a construction whereby traction elements may be applied to the wheels of motor vehicles quickly and easily under all conditions.

In accordance with the foregoing object and first briefly described, the present invention resides in attachment means carried on the rim of a vehicle wheel on both sides of the tire mounted thereon and individual traction devices which may releasably be attached to said attachment means by hooking one end to the attachment means on one side, drawing the traction portion of the device around the tire and hooking the opposite end under tension to the attachment means on the opposite side of the tire.

In the drawings:

FIG. 1 is a side elevational view of a vehicular wheel having attached thereto the traction apparatus of the invention;

FIG. 2 is an elevational view of a closed lug ring for releasable attachment to a vehicular wheel in the form of the invention seen in FIG. 1;

FIGS. 3 and 4 are fragmentary elevational views of modified forms of the lugs seen on the ring of FIG. 2, and others of the figures;

FIG. 5 is a sectional view taken along the line 5—5 of FIG. 1, showing a chain cross-link of the invention as attached to the lugs on opposite sides of the rim and tire;

FIG. 6 is a fragmentary side elevational view of the apparatus of the invention as seen from the left-hand side of FIG. 5;

FIG. 7 is a view similar to FIG. 6 but from the right-hand side of FIG. 5;

FIGS. 18 through 25 are views of modified forms of cross-links.

Figure 8:
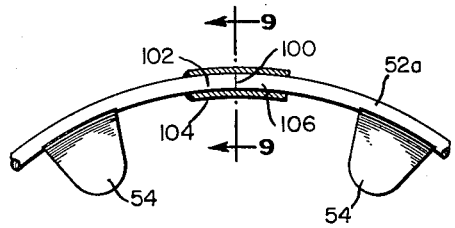
FIG. 8 is a view showing a fragmentary portion of a modified form of lug ring with separable telescoping ends.
Figure 9:
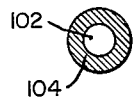
FIG. 9 is an enlarged sectional view taken along line 9—9 of FIG. 8.

Now with more particularity and with detailed reference to the various figures of the drawings, and first to FIGS. 1 through 7, there is shown in FIG. 1 a motor vehicle wheel designated by the numeral 30 having a pneumatic tire 32 mounted thereon in conventional manner. The wheel is of substantially conventional stamped metal construction with hub and rim portions 34 and 36 respectively. The rim includes inner and outer side wall portions 38 and 40 (FIG. 5) which are substantially coplanar and which terminate in outwardly extending flanges 42 and 44 respectively, each having a slight curvature outwardly and then downwardly toward the axis 46 of the wheel. The curvature is such as to provide shallow grooves or recesses 48 and 50 around the outer peripheries of the rim side walls 38 and 40.

Figures 11, 12:
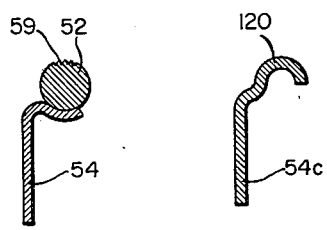
FIG. 11 is a sectional view taken along the line 11—11 of FIG. 10.
FIG. 12 is a sectional view taken along line 12—12 of FIG. 2.

As seen in FIG. 2, there is provided a closed, preferably metallic ring member 52 having a plurality of inwardly projecting metallic attachment elements or lugs 54 suitably secured thereto as by welding the flange 55 to the inner periphery of the ring. Preferably the lugs are evenly spaced around the ring, which, as seen in FIGS. 2 and 12, is round in cross-section, with a cross-sectional radius substantially, but not necessarily, the same as the outward curvature of the rim flanges 42 and 44. The major diameter of the ring 52—that is to the outer periphery—is, in this form of the invention, greater than the diameter of the terminal edges 56 and 58 of flanges 42 and 44 respectively, but substantially equal to the diameter of the recesses 48 and 50. The aforesaid dimensions are such as to permit a lug ring to be forced or snapped into each of the grooves 48 and 50. This may easily be accomplished by placing one side of the ring in the groove at one side of the rim and then tapping the ring progressively around its periphery with a suitable tool, such as a mallet. There is sufficient flexibility in the ring and in the rim flanges to permit rings thus to be forced or snapped into the recesses on opposite sides of the rim and to be snugly held there. The installation is such as to retain the rings for as long as desired without fear of their becoming dislodged under normal usage. If desired the outer periphery of the ring may be serrated, as at 59 (FIG. 12). A prying tool, claw hammer or similar device is all that is needed to pry the rings loose. Of course, with the permanently closed lug ring it is necessary to remove the wheel from the vehicle to mount the inner ring, but once this is done it remains as a semi-permanent part of the wheel ready for emergency use. On the other hand, as explained hereinafter, the rings may be so constructed as to enable the inner ring to be mounted without removing the wheel if desired.

With rings mounted on the driving wheels of a vehicle as described above, the vehicle is ready for all road emergencies involving traction for the wheels whether it be snow, mud, deep sand or other condition. When traction is needed it is only necessary now to attach cross-links 60 around the tire between oppositely aligned lugs 54 as clearly shown in FIG. 5, the lugs on the oppositely mounted rings being aligned when mounting the rings to the rim.

To mount a cross-link, it is placed over the periphery of the tire—inside to outside—with the end carrying the loop 63 on the inside. Loop 63 is then hooked over lug 54a (FIG. 5) and the cross-link is then drawn tightly over the outer peripheral surface of the tire from inside to outside and the outer loop 64 hooked over outer lug 54b. Springs 62 are provided to permit the links to be extended to the length necessary to pass over the outer lug and then to retract and place the links under proper tension between the lugs to retain them in this operative position on the tire.

The cross-links may take many forms as will be brought out hereinafter, but in FIGS. 5, 6 and 7 it is shown as comprising a pair of chains 66 having their opposite ends connected to spacer bars 68 as by U-shaped connector links 70. As seen in FIG. 6 showing the inner side of the tire, the end loop 63 is formed by a U-shaped wire member with its ends formed into eyes 72 pivotally connecting the loop to bar 68. Loop 64 on the outer side of the tire is similarly shaped but has its eyes 76 connected to one end 78 of each of the springs 62, the other ends 80 of the springs being connected to spacer bar 68 through holes therein.

Spring 62 may vary in length and in strength. Normally they are of such strength as to make it necessary to use a tool to mount or dismount the crosslinks. When hooking the outer loop 64 over lug 54 in the mounting procedure, a screw driver, or other suitable prying tool, is inserted in loop 64 under its end bar 90 and onto the top 89 of lug 54, then by prying inwardly in an arc toward the center of the wheel, the end bar 90 is slipped over the lug and from the tool which is removed. The top 89 of the lug may be rounded, as seen in some figures but it is preferably to form them flat (FIG. 3) or slightly concave (FIG. 4) to prevent the tool from slipping off. When removing the cross-links, the tool is inserted between the rim and a cross bar 91 and pried off, the springs 62 expanding in each case.

Thus it is seen that under most emergency conditions where extra traction is needed one or more cross-links may easily be attached to a vehicle equipped with the device of the present invention. For example, when a vehicle is hub deep in snow, mud or sand, one or more cross-links may quickly and easily be attached to the upper portion of the wheel after which the wheel may be turned under its own power to move the lower portion upwardly for attachment thereto of additional cross-links, is necessary. Under normal snow driving conditions links will be mounted all around the wheel as seen in FIG. 1.

As mentioned above, the lug-rings and the cross-links may take a variety of forms and construction. For example, as seen in FIG. 8, the lug-ring 52a may be split, as indicated at 100, with one end 102 provided with a sleeve 104 fixed thereto for receiving the other end 106 of the ring. With this, and other split ring types of lug rings, it is not necessary to remove the wheel from the vehicle to mount the ring on the inner side of the rim. The ring is merely opened and its ends 102 and 106 passed over opposite sides of the axle and other vehicle equipment on the inside of the wheel, then joined again and mounted on the wheel.

Figure 15:
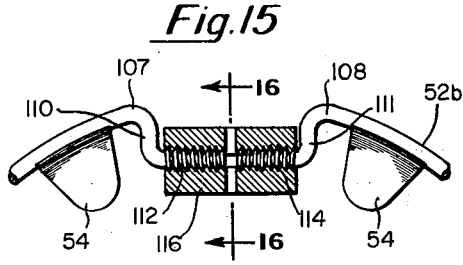
FIG. 15 is a fragmentary view of still another modification of the lug ring wherein separate ends are secured together by a take-up nut.
Figures 16, 17:
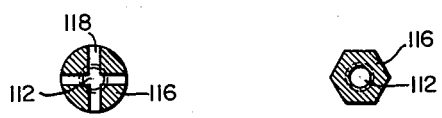
FIG. 16 is a sectional view taken along line 16—16 of FIG. 15.
FIG. 17 is a view similar to FIG. 16 but showing a modified form of take-up nut.

Another split type of lug-ring is shown in FIG. 15, wherein the ends 107 and 108 of the ring 52b are bent inwardly for a short distance, as seen at 110 and 111, and the terminal ends 112 and 114 are bent toward but short of each other. The ends 112 and 114 are oppositely threaded to receive a take-up nut 116. The nut may be hexagonal as seen in FIG. 17, or tubular, as seen in FIG. 16. In the latter case the nut will have tool holes 118 for turning it. With this form of ring (52b) it is evident that the rings may be contracted to a smaller diameter than the rim flanges 56 and 58 (FIG. 5), by turning the nut in one direction, placed in the rim grooves 48 and 50, and then by turning the nut in the opposite direction the ring may be expanded tightly against the inner surface 48 and 50 of the grooves securely to lock the rings to the wheel.

Figure 10:
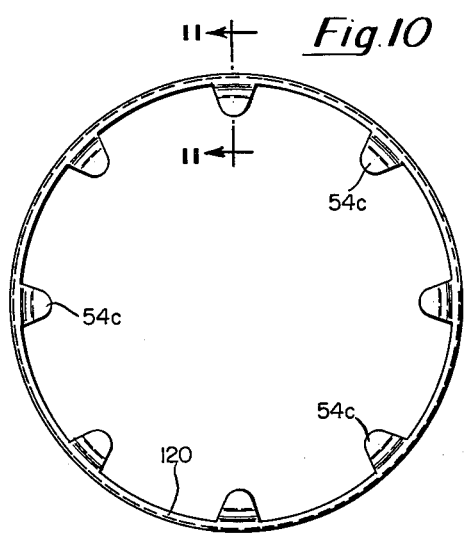
FIG. 10 is an elevational view of another modified form of lug ring.

Still further as seen in FIGS. 10 and 11, the ring may be formed as a U-shaped channel 120 with the lugs 54c integrally formed therewith.

Figure 13:
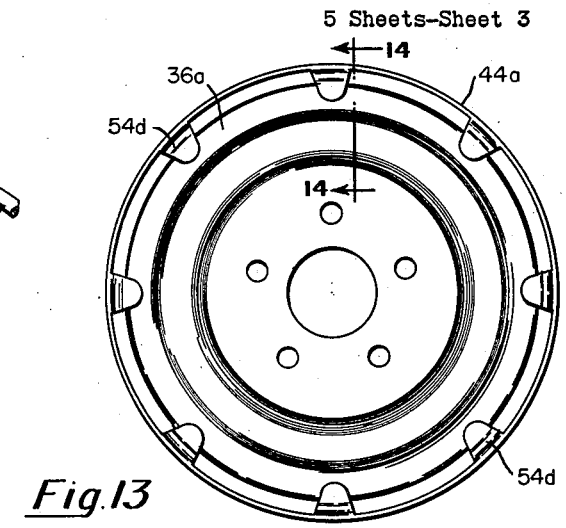
FIG. 13 is an elevational view of another modified form of the invention wherein the attachment lugs are integral with the rim of the wheel.
Figure 14:
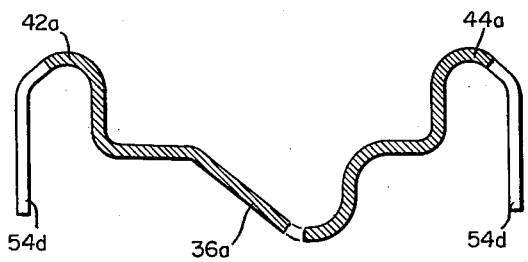
FIG. 14 is a fragmentary view taken along the line 14—14 of FIG. 13.

In another form of the invention, as seen in FIGS. 13 and 14, the lugs 54d may be formed integrally with the wheel flanges 42a and 44a.

Figure 18:
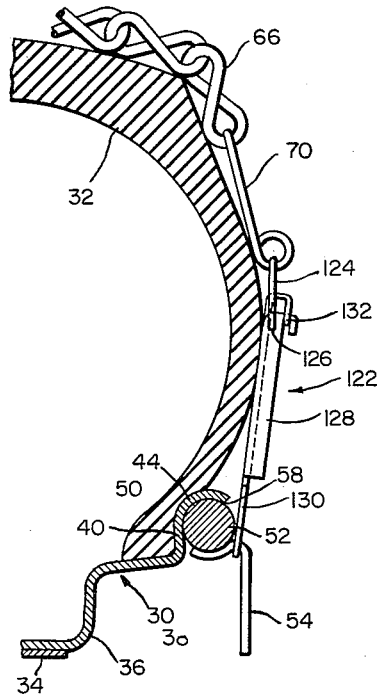
Figure 19:
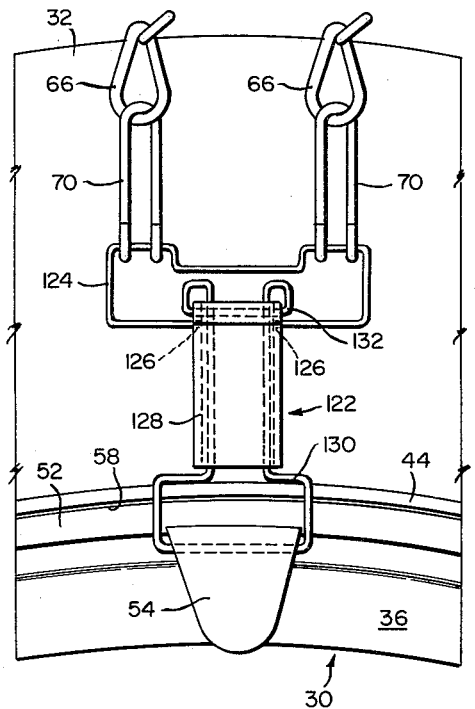

Referring now to FIGS. 18 and 19, it is seen that in a modified form of cross-link, an over-center type clasp 122 similar to the type as used on luggage may replace the loop 64 as seen in FIG. 5. The clasp includes the spacer bar 124 which may be a solid bar as previously described, but which has been illustrated in FIGS. 18 and 19 as heavy wire with its ends 126 connected to a latch bar 128. Also included is the wire loop 130 which has its ends 132 connected to the latch bar in a position offset from the ends 126 of spacer bar 124 whereby movement of the latch bar 128 to open condition will release the tension of loop 130 on lug 54 so that the loop may easily be disconnected from the lug and the cross-link dismounted from the wheel. In mounting the cross-link to the wheel the reverse procedure is followed.

Figure 20:
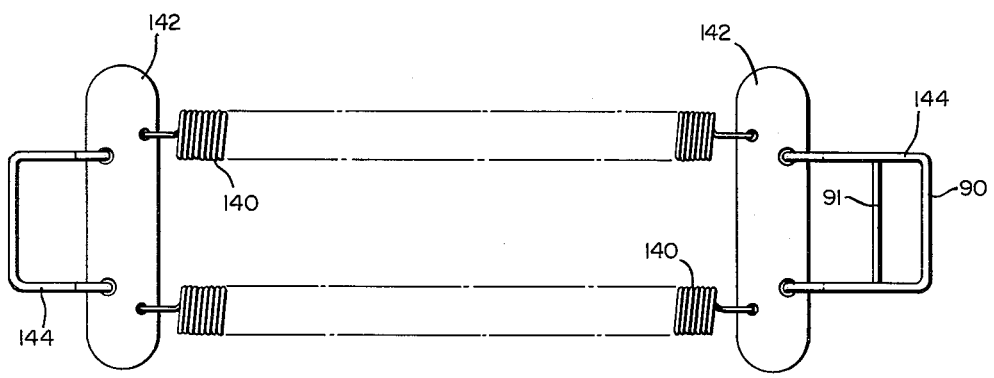

Further modifications within the scope of the invention are shown in the remaining figures. In FIG. 20 the cross-links are in the form of coil springs 140 which serve as the traction means and eliminate the need for further tensioning means to hold the cross-link on the wheel. The ends of the springs are directly connected to the cross-bars 142 carrying the lug loops 144.

A spring steel strip 150 forms the cross-link as seen in FIGS. 21 and 22. The strip is shown as flat or planar but it is contemplated that in its preferred form it will be preformed with a curve complementary to that of a cross-section of the tire to which it is to be attached. Rubber shoes 152 are bonded to the cross-strips 153 to serve as the traction means and take the wear. Loops 154 and holes 155 formed in the strip at its opposite ends provide the means for attachment to ring lugs 54. The ends 156 of springs 158 are connected to the strip through holes 155 and have their opposite ends connected to a lug loop (not shown) but the same as shown in FIG. 7.

Twisted wire flexible cables 160 provide the traction element of the cross-link modifications seen in FIG. 23. The ends 162 of the cables are firmly secured to the ends 164 of coil springs 166. Threaded sleeves 168 welded to the cable ends serve this purpose. The spring ends 164 are threaded over the sleeves with sufficient tightness to hold them on the sleeves, or alternatively they may be spot welded there, if desired. The ends 169 of the lug loops 170 are secured to the outer ends 172 of the springs.

Of course, any of the cross-links may be of the single variety such as shown by way of example in FIG. 24. Here the single cross-chain 180 has one end 182 directly connected to a lug-loop 184 which is shown here as being triangular in shape. The other end 186 of the chain is connected to one end 188 of coil spring 190 which has its other end 192 connected to another triangularly shaped lug loop 194.

Another modification of the cross-links is shown in FIG. 25, wherein the attachment loops 196 at both ends of the cross-link are formed with lateral extensions or eyes 198 for attachment to the springs 200 at one end, and the chains 202 or other traction elements at the other end. As seen on the left-hand loop, cross-bars 204 and 205 may be provided on any of the corresponding loops to provide means for adding tension to the cross-links by selectively hooking these bars over the lugs 54, instead of the end bar 206.

Thus it is seen that the apparatus of the present invention provides unique traction apparatus for vehicular wheels, apparatus simple and easy to apply to a wheel under substantially all conditions.

What is claimed is:

1. A traction device for attachment to the rims of motor vehicle wheels having outturned peripheral flanges on its opposite sides and inwardly facing grooves in said flanges, comprising, a pair of split ring members of substantially the same diameter as the major diameter of said groove, one ring of said pair being for releasable securement to one side and the other to the opposite side of said wheel rims in said grooves by force fit, a plurality of lugs secured to and spaced around said ring members and projecting inwardly thereof, and extensible-retractible cross-links having means at their opposite ends for releasable attachment over oppositely positioned lugs on said ring members carried on opposite sides of said rim.

2. A traction device according to claim 1 wherein each of said split rings includes means for releasably joining its ends.

3. Apparatus according to claim 2 wherein said means for joining the ends of said split ring member comprises a sleeve into which the ends are telescopically received.

4. A traction device according to claim 1 wherein said rings are of channel shape.

5. Traction apparatus for motor vehicles comprising, a rim having spaced apart outwardly turned peripheral terminal flanges having slightly inturned peripheral edges thus to form radially inwardly facing shallow peripheral grooves on opposite sides of said rim, a tire mounted between said flanges, a pair of closed ring members, each having substantially the same outer diameter as the major inner diameter of said grooves whereby one ring member may releasibly be secured to each of said flanges by force fit being snapped into said grooves by forcing them over the slightly inturned peripheral edges, each ring member having attachment means secured thereto in spaced relation, and a cross link releasably attached to said attachment means and extending around said tire from one side to the other.

References Cited in the file of this patent

UNITED STATES PATENTS

| | | |
|---|---|---|
| 1,478,059 | Pye | Dec. 18, 1923 |
| 1,529,558 | Staggers | Mar. 10, 1925 |
| 1,556,504 | Elliott | Oct. 6, 1925 |
| 1,785,117 | Fonferek | Dec. 16, 1930 |
| 1,884,283 | Schneider | Oct. 25, 1932 |
| 1,943,918 | King | Jan. 16, 1934 |
| 2,474,521 | Fogarty | June 28, 1949 |
| 2,589,207 | Welsh | Mar. 11, 1952 |
| 2,631,637 | Purdy | Mar. 17, 1953 |
| 2,898,966 | Machesney | Aug. 11, 1959 |
| 2,955,634 | Schieber et al. | Oct. 11, 1960 |